United States Patent [19]

Artz

[11] Patent Number: 5,025,382

[45] Date of Patent: Jun. 18, 1991

[54] DATALINK CONTROLLER INTERFACE

[75] Inventor: John M. Artz, Rockville, Md.

[73] Assignee: The Mitre Corporation, Bedford, Mass.

[21] Appl. No.: 448,965

[22] Filed: Dec. 12, 1989

[51] Int. Cl.$^5$ .................. G06F 15/48; G09G 1/00; G08B 21/00; G08G 1/123

[52] U.S. Cl. .................. 364/439; 364/424.01; 364/444; 340/700; 340/945; 340/961; 340/979; 340/988; 340/990

[58] Field of Search .................. 364/424.01, 439, 444, 364/521, 522, 709.01, 709.02, 709.11; 340/700, 718, 945, 947, 951, 961, 979, 988–990

[56] References Cited

U.S. PATENT DOCUMENTS

| | | | |
|---|---|---|---|
| 3,369,239 | 2/1968 | Perkinson et al. | 340/990 X |
| 4,086,632 | 4/1978 | Lions | 364/444 |
| 4,437,085 | 3/1984 | Salant | 340/990 X |
| 4,675,676 | 6/1987 | Takanabe et al. | 364/424.01 X |

OTHER PUBLICATIONS

"At the Crossroads in Air–Traffic Control", by Gordon D. Friedlander, IEEE Spectrum, Jul. 1970, pp. 69–83.

Primary Examiner—Parshotam S. Lall
Assistant Examiner—Edward J. Pipala
Attorney, Agent, or Firm—Larson and Taylor

[57] ABSTRACT

A digital data link is provided between an air traffic controller at a ground station and the pilot of an aircraft through digital communication between a computer on that aircraft and a ground-based computer located at the ground station and including an associated display screen containing a spatial representation of the airspace around the aircraft as well as a representation of the location of the aircraft in that airspace. A pointing device is moved to cause movement of a cursor on the display screen, beginning at the representation of the aircraft, corresponding to the movement of the aircraft that the controller intends. In response to this cursor movement, there is generated on the screen a cursorline representative of the movement of the cursor and thus of the intended path of aircraft. The ground-based computer calculates, from the beginning and the end points of the cursorline, and the length of the cursorline, the intended heading of the aircraft and the distance to be flown. Digital data related to calculated intended heading and distance is transmitted to the aircraft computer.

16 Claims, 2 Drawing Sheets

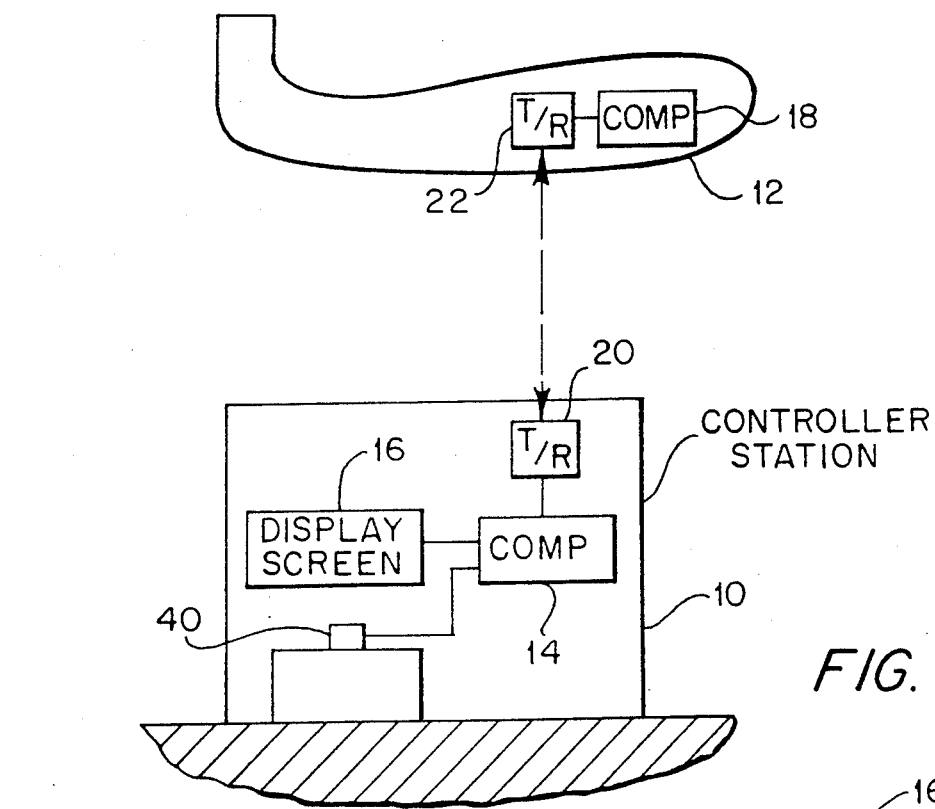
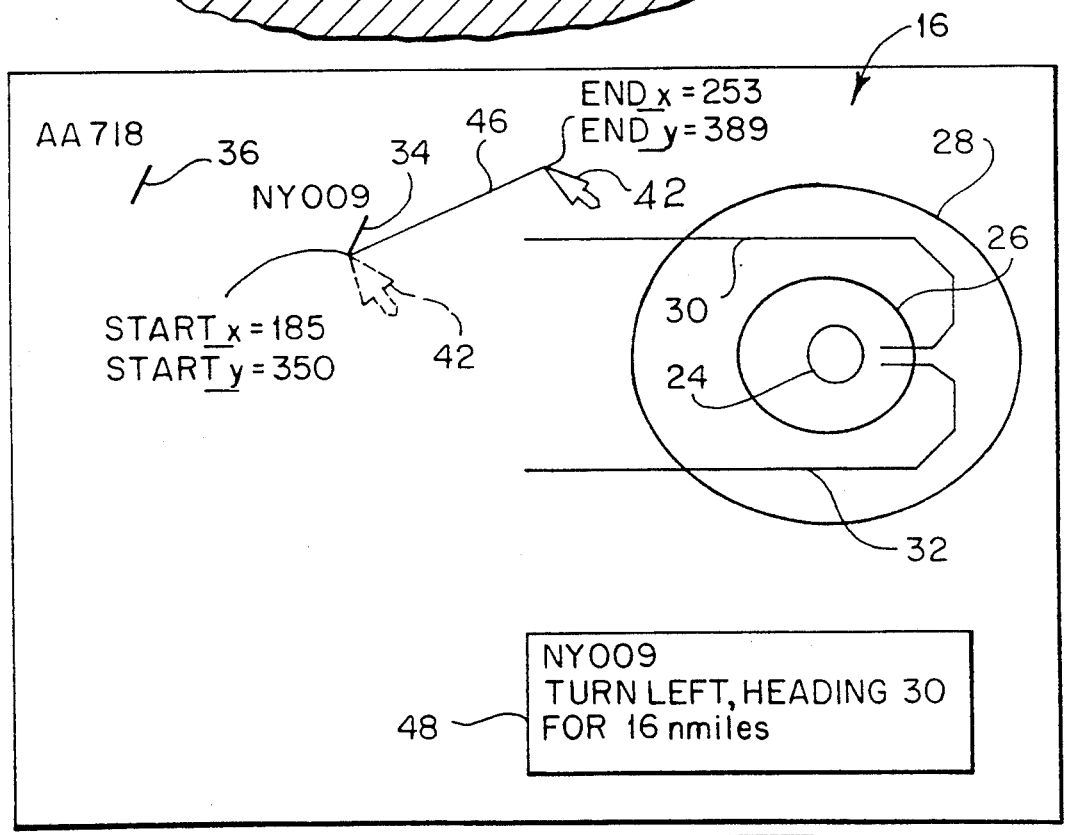
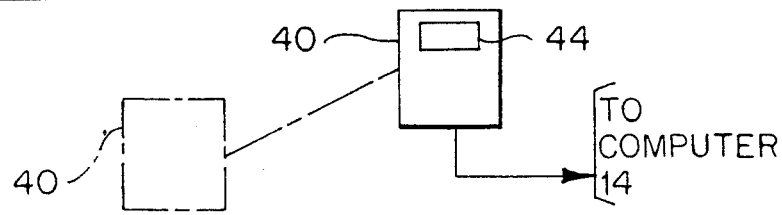
FIG. 1
FIG. 2

DATALINK CONTROLLER INTERFACE

FIELD OF THE INVENTION

The present invention generally relates to air traffic control and, more particularly, an improved method and apparatus for creating and communicating air traffic control messages between an air traffic controller and a pilot via a digital communications link.

BACKGROUND OF THE INVENTION

The Federal Aviation Administration (FAA) has developed a datalink program for digital communication between aircraft and ground based computers. One of the potential uses of this digital datalink is in the dynamic control of such aircraft. The FAA is also conducting long range research programs with respect to automation aids that will require the air traffic controller to inform the ground-based computer of the tactical control actions that are to be taken by the aircraft so that the ground-based computer can generate more accurate information for use by the airborne computer.

Such digital data links between ground-based air traffic control computers and airborne flight deck computers could provide a number of potential advantages. These advantages include a reduction in both controller and pilot workload and a reduction in errors and misinterpretations that occur in voice communications between the controller and pilot. In general, such digital communication links can provide an exchange of data with greater speed and accuracy and with greater information content than is currently available with voice communication.

It will be appreciated that while digital data links possess the potential advantages discussed above, a number of possible problem areas must be addressed before the use of such a data communication link becomes practical. One of these potential problem areas concerns the nature of the interface through which the controller and the pilot are to communicate. Such an interface must maximize safety and accuracy, take into consideration the respective roles of man and machine, and keep the workload at an optimal level. It will be appreciated that due to the complexity of the air traffic control environment and the need to respond quickly to developing situations, issues involving the "human factor" in the communication interface are of paramount importance. In this latter regard, it is noted that while the pilot may select items from a menu on a computer screen or type in messages to be transmitted to the controller, these traditional data entry approaches may not always be appropriate for the controller.

Considering keyboard entry, using the standard "QWERTY" keyboard to enter all tactical maneuvering commands is an unrealistic burden to place on the controller because: (i) many controllers simply cannot type fast enough to input commands using the keyboard; (ii) keyboard input requires the controller to take his attention away from the screen and switch from a spatial model of the airspace to a verbal/textual model of command; and (iii) the error rate for keyboard entry is unacceptably high. In the latter regard, it is believed that the addressing errors produced from transpositions or misstruck keys would probably be even higher than the same types of errors that occur today using conventional voice communication.

Regarding the use of menus, this is a possible alternative (or companion) approach to message creation. With this approach, the controller would construct a message from predefined menus corresponding to a predetermined grammar for the air traffic control commands. Although this use of menus would reduce keystroke errors, this approach still requires a shift from a spatial mental picture to a verbal/textural mental process. Further, the selection of phrases from a series of menus is likely to be too time consuming to allow the construction of messages in emergencies or in other time critical situations.

As discussed in detail below, the present invention provides a controller with a spatial representation of the airspace being controlled. It will be understood that such a spatial representation is not unique and is employed in situation displays now being used. Further, modern user interfaces (such as the Macintosh or MS Windows interface) provide for direct screen manipulation by permitting a user to select items on a screen using a mouse and a cursor. In air traffic control systems a rudimentary form of this capability is available in that, for example, controllers can use a "trackball" (a hand operated pointing device) to select an aircraft for "handoff".

SUMMARY OF THE INVENTION

In accordance with the invention, a method and apparatus are provided which enable improved communication between ground-based and airborne computers used in air traffic control systems operating in a digital communications environment. The invention provides a datalink controller interface wherein the controller is able to directly manipulate a screen containing a spatial representation of the involved airspace to construct air traffic control messages. In contrast to the user interfaces discussed above, the invention uses a pointing device (e.g., a mouse or trackball) and a cursor controlled thereby to provide more than simple selection and, in particular, to communicate information beyond simple selection to the computer.

As will become apparent, by allowing the controller to communicate with the computer through direct manipulation of the screen, the required keystrokes and/or menu selections are minimized. Further, messages are generated based on system knowledge of the current air traffic situation in conjunction with the input provided by the controller, thereby reducing the workload of the controller. In addition, the user (controller) is in control of the message generating activity rather than passively monitoring the computer, although the user can still delegate to the computer most of the activity in connection with creating a message if this is desired or appropriate. Further, the presentation of a representation of an airspace in addition to message creating (as well as signaling to the controller, using the screen, that a message has been transmitted and acknowledged) are all spatially and visually oriented activities, and thus eliminate the need for the user to switch from spatial to verbal cognitive modes when generating messages. In this latter regard, verbal communications are eliminated in generating a message, and as explained below, the screen is used to represent, spatially, the aircraft movement commanded by generating a cursorline (e.g., or mouseline) to indicate the parameters defining this movement (e.g., heading and distance). The full nature and importance of this advantage will become more evident from considering specific examples set forth below.

In accordance with one aspect of the invention, a method is provided for establishing a digital data link between an air traffic controller at a ground station and the pilot of an aircraft through digital communication between a ground-based computer located at the ground station and including an associated display screen containing a spatial representation of the airspace around the aircraft as well as a representation of the location of the aircraft in that airspace, and a computer on that aircraft, that method, in accordance with a preferred embodiment thereof, comprising: moving a pointing device to cause movement of a cursor on the display screen, beginning at the representation of the aircraft, corresponding to the movement of the aircraft that the controller intends; generating on the display screen, in response to the movement of the cursor, a cursorline representative of the movement of the cursor and thus of the intended path of aircraft; using the ground based computer to calculate, from beginning and the end points of the cursorline, the intended heading of the aircraft; and transmitting digital data related to calculated intended heading to the computer on the aircraft.

In a preferred embodiment the method further comprises calculating, based on the length of the cursorline, the distance the aircraft is intended by the controller to travel. Advantageously, the heading and distance calculated are both displayed on the display screen so that they can be checked by the controller.

In an extension of this aspect of the invention, a custom flight path for the aircraft is constructed by using the pointing device to generate on the screen a plurality of cursorlines or line segments connected end to end so as to represent the intended custom flight path, i.e., to trace out on the screen, using the cursorlines, a flight path designed by the controller.

Preferably, this method also involves calculating the heading and distance represented by each of said cursorlines, and advantageously, displaying the heading and distance represented by each of the cursorlines or line segments.

In accordance with a further aspect of the general method of the invention, the cursorline joins the representation of the aircraft to a representation on the display screen of a pre-existing flight path for the aircraft, i.e., by terminating the cursorline at the beginning of the flight path, so as to define a complete flight path for the aircraft.

According to yet another aspect of the general method of the invention, the display screen contains representations of at least two aircraft, and cursorlines are drawn between the aircraft to indicate the sequence in which the aircraft are to fly along the intended flight path.

In accordance with a different but related aspect of the invention, an improvement is provided in an air traffic control system including a ground-based computer, for communicating with a computer on an aircraft to be controlled, the ground-based computer including an associated display screen containing a spatial representation of the airspace around the aircraft as well as a representation of the location of the aircraft in that airspace. The improvement, according to a preferred embodiment thereof, comprises the provision of (i) a pointing device for causing movement of a cursor on the display screen, beginning at the representation of the aircraft, corresponding to the movement of the aircraft that the controller intends, and of (ii) a said ground-based computer which comprises means for generating on the screen, in response to the movement of the cursor, a cursorline representative of the movement of the cursor and thus of the intended path of the aircraft and for calculating, based on the beginning and end points of the cursorline, the intended heading of the aircraft so that digital data related to calculated intended heading can be transmitted to the aircraft computer. In an advantageous embodiment, the pointing device comprises a mouse, and the mouse includes at least one control button for controlling generating of the cursorline.

Although the invention has particular applicability to air traffic control and appears to be of the greatest importance in enhancing data communication between aircraft and ground-based computers, it will be appreciated that the invention is not limited to this application and can be used, for example, in providing remote control, through a computer link, of the path of travel of other vehicles.

Other features and advantages of the invention will be set forth in, or apparent from, the following detailed description of preferred embodiments of the invention.

BRIEF DESCRIPTION OF THE DRAWINGS

FIG. 1 is a highly schematic representation in block diagram form, of a digital data link between the controller station of an air traffic control system and an aircraft to which commands are to be transmitted;

FIG. 2 is a schematic diagram of the display screen of FIG. 1 and an associated "mouse" or like pointing device used in controlling the movement of a cursor on the screen and illustrating the use of the cursor in generating cursorline representative of the movement of an aircraft intended by the controller.

DESCRIPTION OF THE PREFERRED EMBODIMENTS

Figure 3:
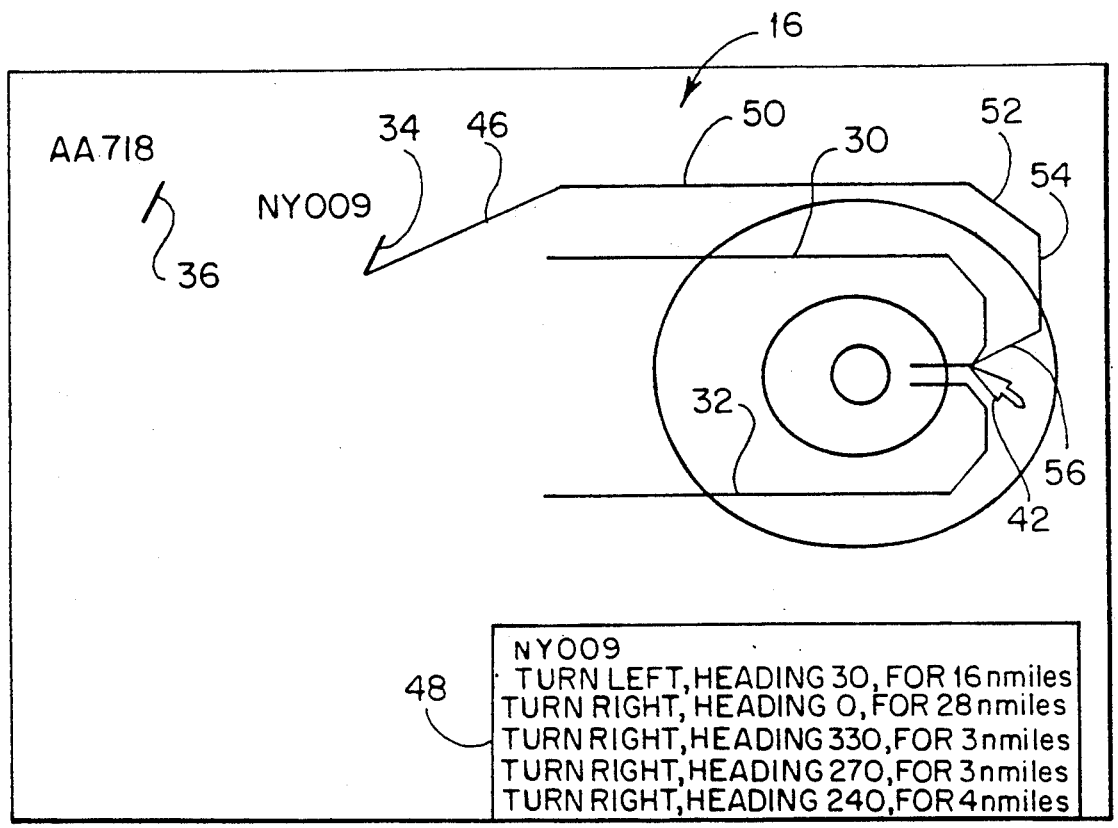
FIGS. 3 and 4 are schematic diagrams of the display screen of FIGS. 1 and 2, illustrating other modes of operation.

Referring to FIG. 1, a highly schematic block diagram is provided which shows a digital data link between an air traffic controller station 10 and an aircraft 12. The controller station 10 includes a ground based computer 14 having an associated screen display 16 while aircraft 12 includes an airborne flight deck computer 18. As is indicated schematically in FIG. 1, data is transmitted between computers 14 and 18 over a digital communication link including transmitter/receivers 20 and 22 located at the controller station 10 and on board aircraft 12, respectively.

Referring to FIG. 2, a computer display screen 16 is shown corresponding to that represented schematically in FIG. 1. The display graphics provided by the screen 16 includes, permanently displayed thereon in accordance with conventional practice, a series of circles or ovals 24, 26 and 28 representing different ranges from a central landing field as well as a permanent, fixed display of a pair of added flight approach paths 30 and 32 that can be taken in landing an aircraft approaching from opposite sides of the landing field. This part of the display is conventional and such information is incorporated in the same or a similar way in most air traffic controller displays. The display graphics on display screen 16 shown in FIG. 2 also include a pair of short slanted lines 34 and 36 which represent, respectively, the current positions of two different aircraft identified here as "NY009" and "AA718". It will, of course, be understood that these lines 34 and 36 move on the display, tracking the movement of the corresponding aircraft based on positional data provided to the computer control for the display. In this way the controller is provided with spatial information regarding the positions of the aircraft relative to the landing area.

Turning now to the aspects of the display which are based on the present invention, a pointing device, such as a mouse or a trackball and indicated below screen 16 at 40, is used by the air traffic controller in commanding the flight path of an aircraft. In general, pointing device 40 must be able to move a cursor, indicated at 42, on the screen 16 and to send a signal to the computer (e.g., computer 14 of FIG. 1) indicating that a button 44 associated with pointing device 40 has been pushed or depressed. These are, of course, the characteristics of a conventional mouse or trackball and normally the movement of the pointing device 40 would be in a horizontal plane (e.g., on a table) to cause movement of the cursor 42 across the face of the vertical screen 16.

The computer 14 itself must be capable of receiving a signal as described from the pointing device 40 and of determining the location of the cursor 42 when the button 44 is pushed as well as the location of the cursor 42 when the button 44 is released. The computer 14 must also be capable of determining when the cursor 42 is being moved and whether the button 44 is up or down when the cursor 42 is being moved. Again, computers which are capable of cooperating with a mouse or other pointing device in this manner are extremely common and widely commercially available. As mentioned above and will be evident from the discussion which follows, the method of the present invention involves the use of such a pointing device in effecting cursor movements on the display screen 16 in a manner so as to construct or create a cursorline which corresponds to the desired or intended flight path and on which air traffic control commands are based and can perhaps be best understood by referring to the specific examples of the method set forth below, including the numerical examples.

First, in order to generate a cursorline indicating the desired path of movement of an aircraft and, in particular, to provide that the cursor 42 appears to be "dragging" a line across the screen 16 in response to movement of the pointing device 40, when the button 44 on the pointing device 40 is depressed, the computer 14 first determines whether an aircraft is located on the screen 16 close to the cursor point, i.e., the point or spot to which the cursor 42 is pointing. If no aircraft is present, the "message" (i.e., the signal generated in response to depressing the button 44) is ignored by the computer 14. On the other hand, if an aircraft is present, as indicated in FIG. 2 by the cursor 42 shown in dashed lines as pointing to line 34 which represents aircraft "NY009", the screen coordinates of the aircraft as stored in the computer 14 as "start_point = (start_x, start_y)" and in the specific example under consideration, as (185,350).

While the button 44 is depressed the cursor 42 can be caused to move away from the line 34 (representing the aircraft) in response to a change in the position of the pointing device 40, i.e., in response to movement of the pointing device 40 by the air traffic controller in simulating the movement of the aircraft sought to be commanded by the air traffic controller. During this movement, when a new location of the pointing device 40 is established or determined, two lines are drawn on the screen 16. One line is drawn from the "start_point" to the old cursor position, and one line is drawn from the "start_point" to the new cursor position. (It will be understood that the "start_point" and the old cursor position are the same for the very first movement from the starting position, i.e., at the "start_point", of the pointing device 40.) Both lines are drawn on screen 16 using the inverse of the underlying pixel color on the screen 16. Using this approach, the second line will eliminate the first line by setting the pixels back to their previous state. As the pointing device 40 is moved again in tracing out a desired path of movement of the aircraft, the process is repeated and this creates the illusion that the cursor 42 is dragging the cursorline, indicated at 46, which appears on the screen 16. When the button 44 is raised, the last cursorline is drawn over, and the current position of the cursor 42 is stored in the computer 14 as "End_point = (End_x, End_y)" or in this example as (253,389).

The algorithm for dragging the cursorline is as follows:

At Button Down:
  Set Start_point = Old_point = Current_point;
At Cursor Move:
  Draw line using reverse of current pixel color from Start_point to Old_point;
  Draw line using reverse of current pixel color from Start_point to Current_point; and Set Old_point = Current_point
At Button Up:
  Draw line using reverse of current pixel color from Start_point to Current_point; and
  Set End_point = Current_point With this background, the manner in which a heading command can be constructed or created will now be considered. The heading can be computed using basic trigonometric formulas used in calculating the slope of a line, viz:

$$Delta\_x = End\_x - Start\_x$$

$$Delta\_y = End\_y - Start\_y$$

$$Heading = Arctangent (Delta\_y/Delta\_X)$$

In the example under consideration, Delta_x = 253 − 185 = 68; Delta_y = 389 − 350 = 39; and the heading = Arctangent (39/68) = 30 degrees. It is noted that once the heading is determined, the turn direction (i.e., "Turn Left," "Turn Right," or "Maintain") is determined by comparing the new heading to the current heading of the aircraft.

In addition to determining the heading, the method of the invention enables the distance to be flown, i.e., the length of the proposed flight path, to be determined by computing the length of the cursorline. In particular, using the "Start" and "End" coordinates of the cursorline 46 as before and simply applying the Pythagorean Theorem, the screen distance and actual distance can be calculated as follows:

Screen Distance $$Screen\ Distance = \sqrt{(Delta\_x\ squared - Delta\_y\ squared)}$$

and Actual Distance = Screen Distance X Nautical Miles (nmiles)/pixel. Thus, in the example under consideration, the screen distance $$= \sqrt{(68)^2 + (39)^2} = 78.4$$

and, with the number of nautical miles per pixel = 0.2, the actual distance = 78.4 X 0.2 = 15.68 = 16 miles.

After making the necessary computations, the computer 14 then generates on screen 16 the data block indicated at 48 setting out the turn, heading and distance dictated by the cursor movement commanded by the movement of pointing device 40.

Referring to FIG. 3, screen 16 is shown again, this time in connection with the construction of a custom flight path in accordance with a further aspect of the invention. In general, such a custom flight path is created by simply extending the cursorline concept illustrated in FIG. 2. In particular, the flight path is represented by, in addition to cursorline 46, a series of further cursorlines or line segments 50, 52, 54 and 56 which are connected end to end, as illustrated. When creating a heading and distance message of the type discussed above in connection with FIG. 2, the cursorline originates on an aircraft, such as aircraft 34, and "disappears" when the button 44 of the pointing device 40 is raised. When creating a custom flight path, only the first cursorline (cursorline 46) originates on an aircraft (again, aircraft 34) and the cursorline 46 does not disappear when the button 44 is raised. In other words, the cursorline 46 remains on the screen 16 for orienting the next segment of the flight path. Thus, the first segment 46 of the custom flight shown in FIG. 3 is created in the same way as the dragged cursorline of FIG. 2 except that the line 46 does not disappear when the button 44 is raised.

The second segment 50 originates on the end point of the first segment 46 and also remains on the screen when the button 44 is raised. In general, the start_point of the $N^{th}$ segment is the same as the end point of the $(N-1)^{th}$ segment.

Summarizing the foregoing, the algorithm or set of rules for drawing a custom flight is as follows:

First Segment:
(1) Must Originate on an Aircraft;
(2) Generate Heading and Direction Message including Aircraft Identifier; and
(3) Do Not Erase Cursorline Nth Segment:
(1) Must Originate on End_point of (N − 1)th Segment;
(2) Generate Heading and Direction Message; and
(3) Do Not Erase Cursorline As shown in FIG. 3, the screen box 48 preferably displays the aircraft identifier ("NY009") and the headings and distance information for each segment of the flight path.

The basic concepts which underlie the invention can be extended in a number of important ways. For example, referring to FIG. 4, a cursorline or mouseline, corresponding to that shown as a solid line and denoted 60 in FIG. 4, can be drawn from the aircraft being controlled, aircraft 34, to a "fix" 62, i.e., to the beginning of the standard "default" flight path 30 which pre-exists on the screen 16. In this mode of operation the "heading" message contained within block 48 also includes a slow down and descend message which is associated with the particular "fix" 62 (viz., "slow down to 250 knots", "descend to 11,000 feet") and which has been previously stored in computer 14.

Figure 4:
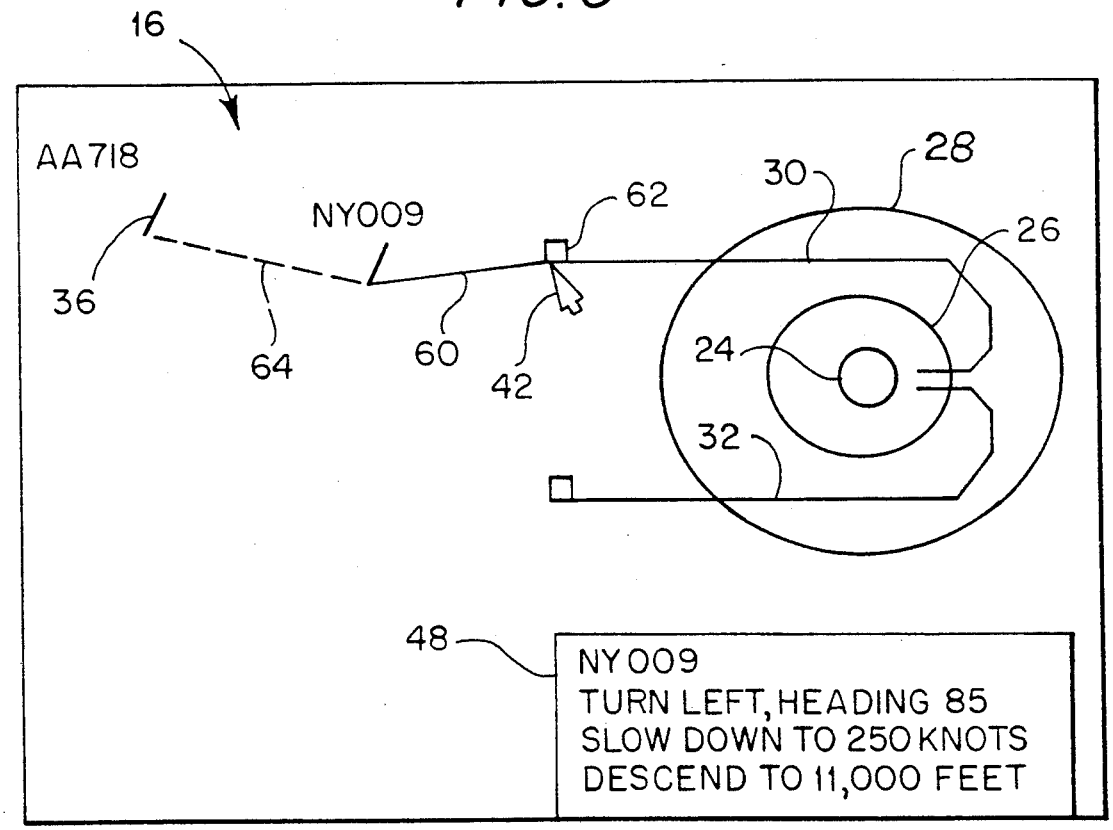

In a further mode of operation also illustrated in FIG. 4, an aircraft sequence is communicated to computer 14 by "connecting the dots" between the aircraft and in particular, in the example shown in FIG. 4, between the aircraft 36 ("AA718") and 34 ("NY009") using a cursorline or mouseline indicated by dashed lines 64. Thus, in this mode of operation the mouseline 64 is used to provide an association (sequencing) between different aircraft.

It will be appreciated that a number of other additions to and variations in the embodiments discussed above are possible. For example, an indication can be provided to the air traffic controller that a data signal representative of the command information set out in box 48 has been transmitted to the aircraft in question by causing the box 48 or the aircraft 34 to blink or change color. Similarly, acknowledgement of such a signal can be indicated in a like manner.

Further, although the present invention has been described relative to specific exemplary embodiments thereof, it will be understood by those skilled in the art that variations and modifications can be effected in these exemplary embodiments without departing from the scope and spirit of the invention.

What is claimed is:

1. A method for providing a digital data link between an air traffic controller at a ground station and the pilot of an aircraft through digital communication between a ground-based computer located at the ground station and including an associated display screen containing a spatial representation of the airspace around the aircraft as well as representation of the location of the aircraft in that airspace, and a computer on that aircraft, said method comprising:
   moving a pointing device to cause movement of a cursor on said display screen, beginning at the representation of the aircraft, to generate a continuous line on the screen between the representation of the aircraft and the cursor corresponding to a potential flight path of the aircraft,
   generating on said screen, in response to the production of a said continuous line corresponding to the flight path of the aircraft that the controller intends, a static cursorline representative of the intended flight path of aircraft;
   using the ground-base computer to calculate, from beginning and the end points of the cursorline, the intended heading of the aircraft; and
   transmitting digital data related to calculated intended heading to the aircraft computer.

2. A method as claimed in claim 1 further comprising calculating, based on the length of the cursorline, the distance of the aircraft is intended to travel.

3. A method as claimed in claim 2 further comprising displaying on said screen the heading and distance calculated.

4. A method as claimed in claim 1 further comprising constructing a custom flight path for the aircraft by using said pointing device to generate on said screen a plurality of cursorlines connected end to end so as to represent the intended custom flight path.

5. A method as claimed in claim 4 further comprising calculating the heading and distance represented by each of said cursorlines.

6. A method as claimed in claim 5 further comprising displaying the headings and distances calculated.

7. In an air traffic control system including a ground-based computer, for communicating with a computer on an aircraft to be controlled, said ground-based computer including an associated display screen containing a spatial representation on the airspace around the aircraft as well as a representation of the location of the aircraft in that airspace, the improvement wherein the system comprises a pointing device for causing movement of a cursor on said display screen, beginning at the representation of the aircraft, to generate a continuous line on the screen between the representation of the aircraft and the cursor corresponding to the flight path of the aircraft that the controller intends and wherein said ground-based computer comprises means for, when actuated by the controller in response to the production of a said continuous line corresponding to the flight path of the aircraft that the controller intends, generating on said screen a status cursorline representative of the intended flight path of the aircraft and for calculating, based on the beginning and end points of the cursorline, the intended heading of the aircraft so that digital data related to calculated intended heading can be transmitted to the aircraft computer.

8. An apparatus as claimed in claim 7 wherein said pointing device comprises a mouse.

9. An apparatus as claimed in claim 8 wherein said mouse includes at least one control button for controlling generating of said cursorline.

10. A method for providing a digital data link between a controller at a control station and the operator of a vehicle through digital communication between a computer located at the control station and including an associated display screen containing a spatial representation of the area round the vehicle as well as representation of the location of the vehicle in that area, and a computer on that vehicle, said method comprising:

moving a pointing device to cause movement of a cursor on said display screen, beginning at the representation of the vehicle, to generate a continuous line on the screen between the representation of the vehicle and the cursor corresponding to a potential path of movement of the vehicle, generating on said screen, response to the production of a said continuous line corresponding to the path of movement of the vehicle that the controller intends, a static cursorline representative of the intended path of movement of the vehicle;

using the control station computer to calculate, based on the static cursorline, at least one parameter related to the path of movement of the vehicle represented by the static cursorline; and transmitting digital data related to calculated parameter to the vehicle computer.

11. A method as claimed in claim 10 wherein said at least one parameter comprises the direction of travel of the vehicle, and the intended direction of travel of the vehicle is calculated based on the slope of the cursorline.

12. A method as claimed in claim 10 wherein said at least one parameter is distance, and the distance over which the vehicle is intended to travel is calculated based on the length of the cursorline.

13. A method as claimed in claim 12 wherein the intended direction of travel of the vehicle is also calculated, based on the slope of said cursorline.

14. A method as claimed in claim 10 wherein a plurality of said cursorlines are generated which are joined together in end to end relation to provide customized path of travel of the vehicle.

15. A method as claimed in claim 10 wherein said cursorline is joined at the distal end thereof to a representation on the display screen of a pre-existing travel path for the vehicle so as to provide a complete travel path for the vehicle.

16. A method as claimed in claim 10 wherein said display screen contains representations of at least two of said vehicles and said method further comprises drawings cursorlines between said vehicles to indicate the sequence in which the vehicles are to travel along the intended path of travel.

* * * * *